US009139090B1

(12) United States Patent
Huang (10) Patent No.: US 9,139,090 B1
(45) Date of Patent: Sep. 22, 2015

(54) METHOD FOR JUDGING ABNORMAL LOADING OF VEHICLES

(71) Applicant: SUNG JUNG MINUTE INDUSTRY CO., LTD., Hsinchu County (TW)

(72) Inventor: Wen-Huo Huang, Hsinchu County (TW)

(73) Assignee: SUNG JUNG MINUTE INDUSTRY CO., LTD., Cyonglin Township, Hsinchu County (TW)

( * ) Notice: Subject to any disclaimer, the term of this patent is extended or adjusted under 35 U.S.C. 154(b) by 0 days.

(21) Appl. No.: 14/503,940

(22) Filed: Oct. 1, 2014

(51) Int. Cl.
*B60K 31/00* (2006.01)
(52) U.S. Cl.
CPC ...................................... *B60K 31/00* (2013.01)
(58) Field of Classification Search
USPC .......................................................... 701/124
See application file for complete search history.

(56) References Cited

U.S. PATENT DOCUMENTS

| | | | | |
|---|---|---|---|---|
| 5,827,957 | A * | 10/1998 | Wehinger ...................... | 73/146.3 |
| 6,264,292 | B1 * | 7/2001 | Umeno et al. ................ | 303/196 |
| 7,461,713 | B2 * | 12/2008 | Kojima ......................... | 180/170 |
| 7,673,504 | B2 * | 3/2010 | Matsuda et al. ............. | 73/146.5 |
| 8,217,776 | B2 * | 7/2012 | Hyde ............................ | 340/442 |
| 2005/0044944 | A1 * | 3/2005 | Kogure et al. ................. | 73/146 |
| 2007/0057478 | A1 * | 3/2007 | Shoyama et al. ............ | 280/86.5 |
| 2007/0164853 | A1 * | 7/2007 | Matsuda et al. ............. | 340/438 |
| 2009/0118891 | A1 * | 5/2009 | Koguchi et al. ................ | 701/29 |
| 2014/0086453 | A1 * | 3/2014 | Imada et al. ................. | 382/103 |
| 2014/0257629 | A1 * | 9/2014 | Singh et al. ................. | 701/34.4 |
| 2014/0278040 | A1 * | 9/2014 | Singh et al. ................. | 701/124 |
| 2014/0303908 | A1 * | 10/2014 | Sotgiu et al. .................... | 702/41 |
| 2015/0005982 | A1 * | 1/2015 | Muthukumar .................... | 701/1 |

* cited by examiner

*Primary Examiner* — Thomas Tarcza
*Assistant Examiner* — Alex C Dunn
(74) *Attorney, Agent, or Firm* — Muncy, Geissler, Olds & Lowe P.C.

(57) ABSTRACT

A method for judging abnormal loading of vehicles includes the steps of: receive a plurality of tire pressures generated by a tire pressure detection unit during a plurality of inspection time periods and calculate variation amount of the tire pressures and convert to a gradient data; judge whether the gradient data is positive in value, if positive, calculate the tire pressure obtained at the last time and tire parameters via a tire sinking amount calculation formula to get a tire deformation amount, and calculate the tire pressure obtained at the last time and the tire parameters via a loading calculation formula to get a tire loading data; and compare the tire loading data and the tire deformation amount via a tire abnormal condition; judge the vehicle in abnormal loading if the tire loading data and the tire deformation amount coincide with the tire abnormal condition.

9 Claims, 7 Drawing Sheets

METHOD FOR JUDGING ABNORMAL LOADING OF VEHICLES

FIELD OF THE INVENTION

The present invention relates to an inspection method of vehicles and particularly to a method for judging abnormal loading of vehicles.

BACKGROUND OF THE INVENTION

Nowadays people have growing awareness on driving safety. In response to such a phenomenon many vehicle plants have provided a detection device on a vehicle to monitor driving safety, such as a vehicle display to record vehicle driving journey or a tire pressure monitoring system (TPMS in short) to measure tire pressure of the vehicle. Take inspection of vehicle abnormal loading for instance, vehicle abnormal loading generally means that when a vehicle carries a load a tire of the vehicle bears the load and generates deformation to make the interior space of tire smaller, and the tire pressure increases to support the load.

At present inspection of vehicle abnormal loading mainly is performed via a universal Hell formula to do assessment and calculation to get tire loading data of the tire. However, due to tire structure is quite complex in general, while the universal Hell formula can provide the tire loading data, during its estimate process of the tire loading data the actual tire deformation amount is not being taken into account, hence the generated tire loading data could be not coincide with the actual circumstance.

SUMMARY OF THE INVENTION

The primary object of the present invention is to solve the problem of the conventional inspection method that does not take into account of the actual change of the tire, hence is prone to create errors.

To achieve the foregoing object the present invention provides a method for judging abnormal loading of vehicles that is adoptable on a vehicle. The vehicle includes a plurality of tires. Each tire includes at least one tire parameter to represent tire characteristics, and is equipped with a tire pressure detection unit. The tire pressure detection unit detects in normal conditions the interior status of the tire and outputs a tire pressure at a selected inspection time period. The method includes the steps as follows:

Step 1: Receive tire pressures generated by the tire pressure detection unit at a plurality of inspection time periods and calculate variation amount of the tire pressure within each inspection time period and convert to a gradient data;

Step 2: Judge whether the gradient data is positive in value, if positive, enter the next step; if negative, redo execution of step 1;

Step 3: Calculate the tire pressure obtained at the last time and the tire parameter via a tire sinking amount calculation formula to get a tire deformation amount, and calculate the tire pressure obtained at the last time and the tire parameter via a loading calculation formula to get a tire loading data; and Step 4: Compare the tire loading data and the tire deformation amount through a tire abnormal condition; in the event that the tire loading data and the tire deformation amount coincide with the tire abnormal condition, judge the vehicle in abnormal loading.

In one embodiment the tire sinking amount calculation formula is as follow:

$$P = \frac{P_0 V_0}{V_0 - \left[\frac{2\sin^{-1}\left(\frac{\sqrt{2Rf - f^2}}{R}\right)\pi R^2}{360} - \frac{(2\sqrt{2Rf - f^2})(R - f)}{2}\right]b}$$

where R, $V_0$, $P_0$ and b are respectively the tire parameters of the tire, R is a tire radius, $V_0$ is an original volume of the tire without loading, $P_0$ is an original tire pressure without loading, b is a cross section width of the tire, and f is a deformation amount of the tire.

In another embodiment the loading calculation formula is as follow:

$$W = 2Pb\sqrt{2Rf - f^2}$$

where P, b and R are the tire parameters, P is the tire pressure, b is the cross section width of the tire, R is the tire radius, f is the deformation amount of the tire, and W is loading data of the tire.

In yet another embodiment the tire abnormal condition is a tire sinking critical value to compare with the tire deformation amount, and a tire loading critical value to compare with the tire loading data.

In yet another embodiment the step 2 further includes a sub-step of activating judgment of vehicle abnormal loading: compare the gradient data via a gradient abnormal datum; if the gradient data has a value greater than or equal to the gradient abnormal datum, enter step 3; if the gradient data has a value smaller than the gradient abnormal datum, redo execution of step 2.

In yet another embodiment the step 2 further includes another sub-step of judging vehicle inclination: get the gradient data of one tire and the gradient data of another tire, and compare the gradient data of these two tires; if the gradient data are same, judge the vehicle being normal; if the gradient data are different, judge the vehicle being inclined.

In yet another embodiment the step 1 is preceded by a sub-step of getting an original condition of the tire before execution: keep the vehicle at a no loading condition, get a tire original volume without loading through a tire volume calculation formula. The tire volume calculation formula is as follow:

$$V_0 = \pi R^2 b$$

where R is the tire radius, b is the cross section width of the tire, and $V_0$ is an original volume of the tire without loading.

In yet another embodiment the step 1 is preceded by another sub-step of providing tire parameters before execution.

Through the method set forth above, compared with the conventional techniques, the invention can provide the following advantageous features:

Judge vehicle abnormal loading through the tire deformation volume and the tire loading data can get the tire status better coincided with the actual tire condition, therefore provide accurate judgment result to avoid incidents caused by erroneous judgment.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
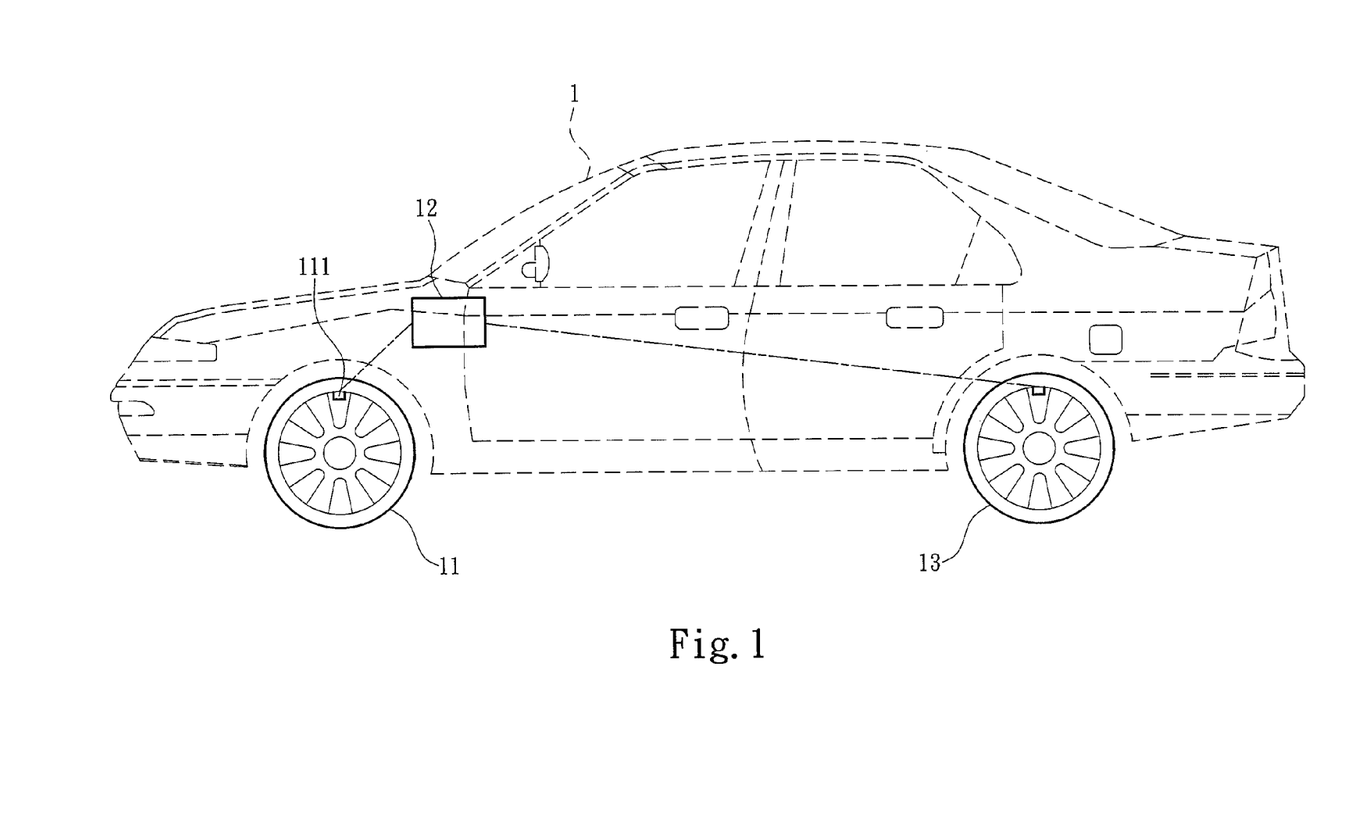
FIG. 1 is a schematic view of an embodiment of the invention implemented on a vehicle.
Figure 2:
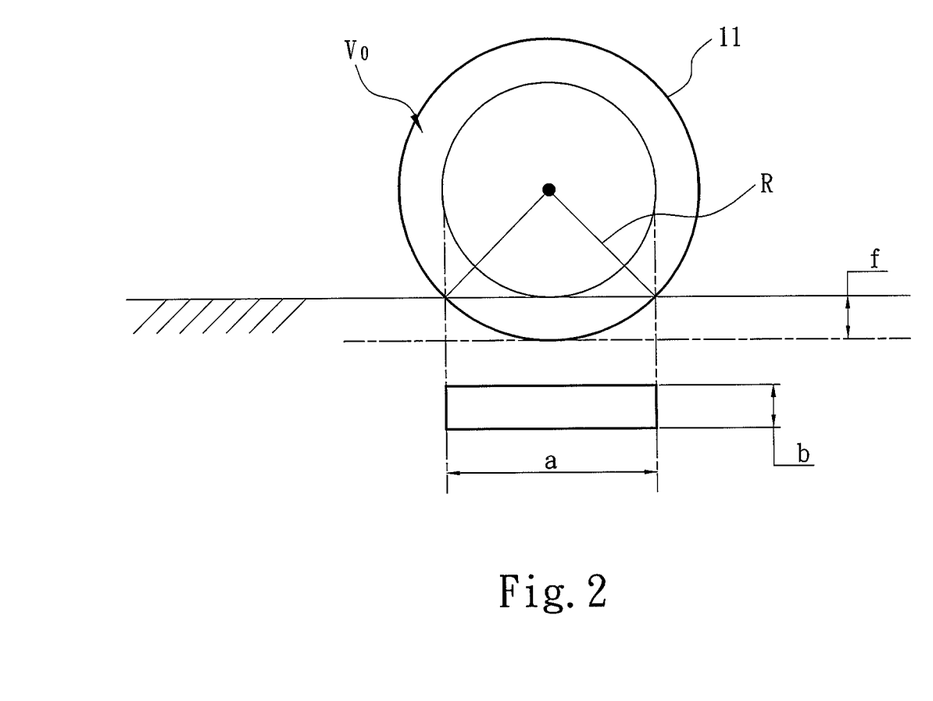
FIG. 2 is a schematic view of an embodiment of the invention regarding tire parameters.

Please referring to FIGS. 1 and 2, the present invention aims to provide a method for judging abnormal loading of vehicles that is adopted for use on a vehicle 1 which has a plurality of tires 11 each includes at least one tire parameter to represent characteristics of the tire 11. Also referring to FIG. 2, the tire parameter can be specification data after the tire 11 has been produced but before being used, such as a tire radius R, a tire tread trace length a, a tire cross section width b, a tire original volume without loading $V_0$ or the like. Moreover, in the invention each tire 11 further is equipped with a tire pressure detection unit 111 which can detect interior status of the tire 11 in normal conditions. The tire pressure detection unit 111 outputs a tire pressure P after an inspection time period T (not shown in the drawings) has elapsed. In one embodiment the tire pressure detection unit 111 can be a tire interior sensing type or a tire exterior sensing type. In another embodiment the vehicle 1 can be equipped with an electronic device 12 to form information link with the tire pressure detection unit 111. The method of the invention can be loaded into the electronic device 12 via a programmable logic language.

Figure 3:
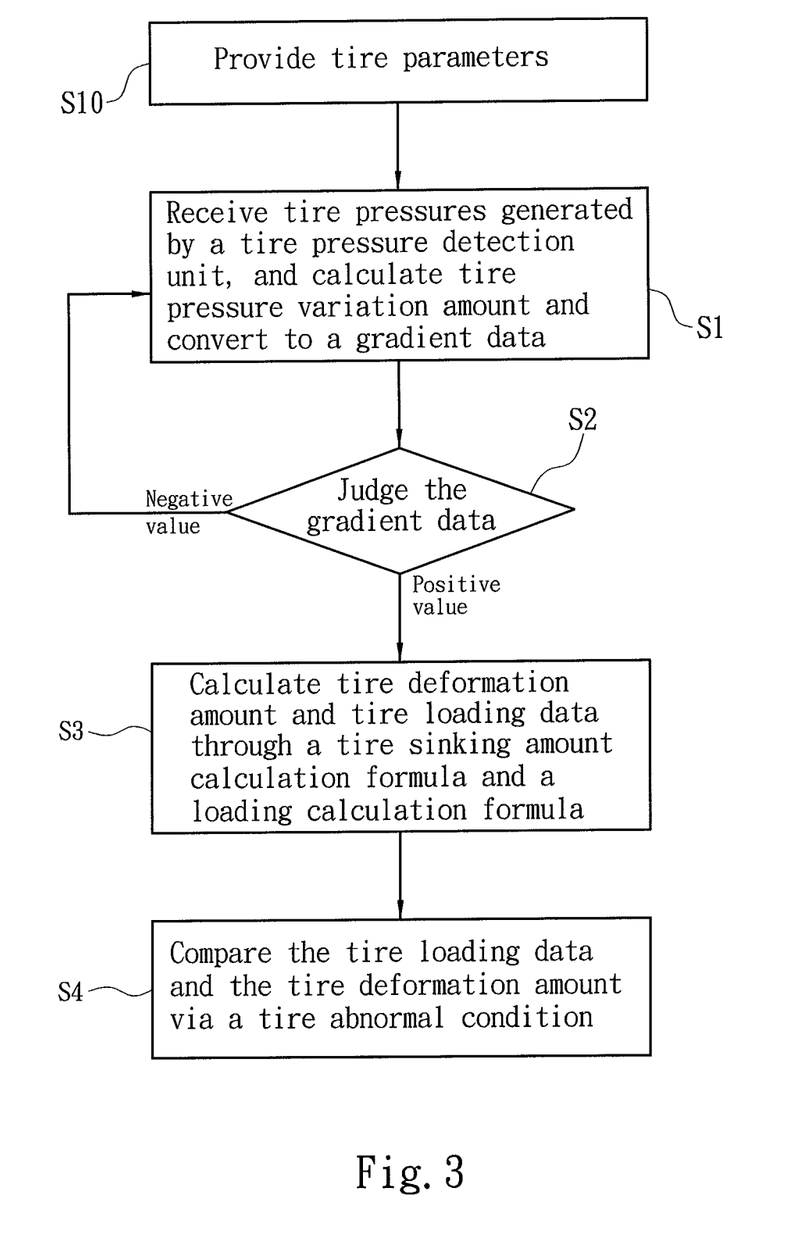
FIG. 3 is a process flowchart of an embodiment of the invention.

Also referring to FIG. 3, the method for judging abnormal loading of vehicles of the invention comprises the following steps:

Step S1: Receive the tire pressures P generated by the tire pressure detection unit 111 during a plurality of inspection time periods T (not shown in the drawings) and calculate variation amount of each tire pressure P within each inspection time period T, and convert to a gradient data M1;

Step S2: Judge whether the gradient data M1 is positive in value; if yes, enter the next step; if no, redo execution of step 1, Step S3: Calculate the tire pressure P obtained at the last time and the tire parameter via a tire sinking amount calculation formula to get a tire deformation amount f, and calculate the tire pressure P obtained at the last time and the tire parameter via a loading calculation formula to get a tire loading data; and Step S4: Compare the tire loading data and the tire deformation amount f via a tire abnormal condition, in the event that the tire loading data and the tire deformation amount f coincide with the tire abnormal condition, judge the vehicle 1 in abnormal loading.

Figure 5A:
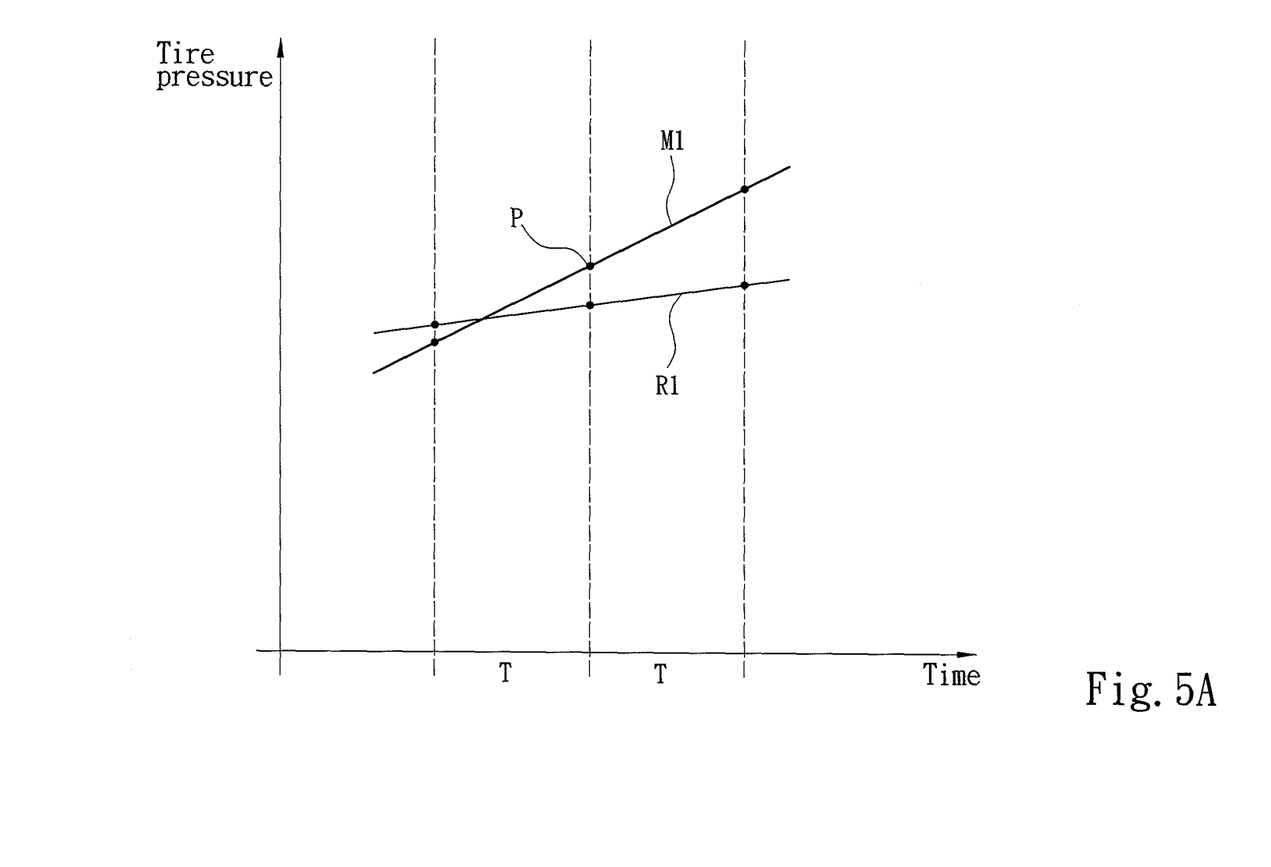
FIG. 5A is a schematic view of an embodiment of the invention showing tire pressures.

More specifically, at the beginning of implementation, first, have the information link of the electronic device 12 installed on one tire pressure detection unit 111 of the vehicle 1, and get consecutively a plurality of tire pressures P generated by the tire pressure detection unit 111 during a plurality of inspection time periods T; next, calculate variation amount of the tire pressures P during the inspection time periods T, and convert to a gradient data M1 (as shown in FIG. 5A), and enter Step 2. At step S2, judge whether the gradient data M1 is positive in value through the electronic device 12; if the outcome is positive, it means that loading of the vehicle 1 continuously increases, and enter step S3; if the outcome is negative, it means that loading of the vehicle 1 continuously decreases. At step S3, first, calculate the tire pressure P obtained at the last time and the tire parameter via the tire sinking amount calculation formula to get a tire deformation amount f. The tire sinking amount calculation formula mainly aims to calculate total deformation amount of the tire 11 after loading. The tire sinking amount calculation formula is as follow:

$$P = \frac{P_0 V_0}{V_0 - \left[\frac{2\sin^{-1}\left(\frac{\sqrt{2Rf - f^2}}{R}\right)\pi R^2}{360} - \frac{(2\sqrt{2Rf - f^2})(R-f)}{2}\right]b}$$

where R, $V_0$, $P_0$ and b are respectively the tire parameters of the tire 11, R is a tire radius, $V_0$ is an original volume of a tire without loading, $P_0$ is an original tire pressure without loading, b is a cross section width of the tire, and f is a deformation amount of the tire. After the deformation amount f of the tire is obtained, get the tire loading data via a loading calculation formula as follow:

$$W = 2Pb\sqrt{2Rf - f^2}$$

where P, b and R are the tire parameters, P is the tire pressure obtained last time, b is the cross section width of the tire, R is the tire radius, f is the deformation amount of the tire, and W is loading data of the tire.

After the deformation amount f of the tire and the tire loading data have been obtained through the tire sinking amount calculation formula and the loading calculation formula, enter step S4 to compare the tire deformation amount f and the tire loading data via the tire abnormal condition. In the event that the tire loading data and the tire deformation amount f coincide with the tire abnormal condition, judge vehicle 1 in abnormal loading. Furthermore, the tire abnormal condition can be an allowable variation of the tire 11 when in use that is set during design of the tire by the tire manufacturer, such as deformation amount of the tire 11 or tire pressure variations after loading of the tire, or the like. More specifically, in one embodiment, the tire abnormal condition includes a tire sinking critical value to compare with the tire deformation amount f, and a tire loading critical value to compare with the tire loading data.

Figure 5B:
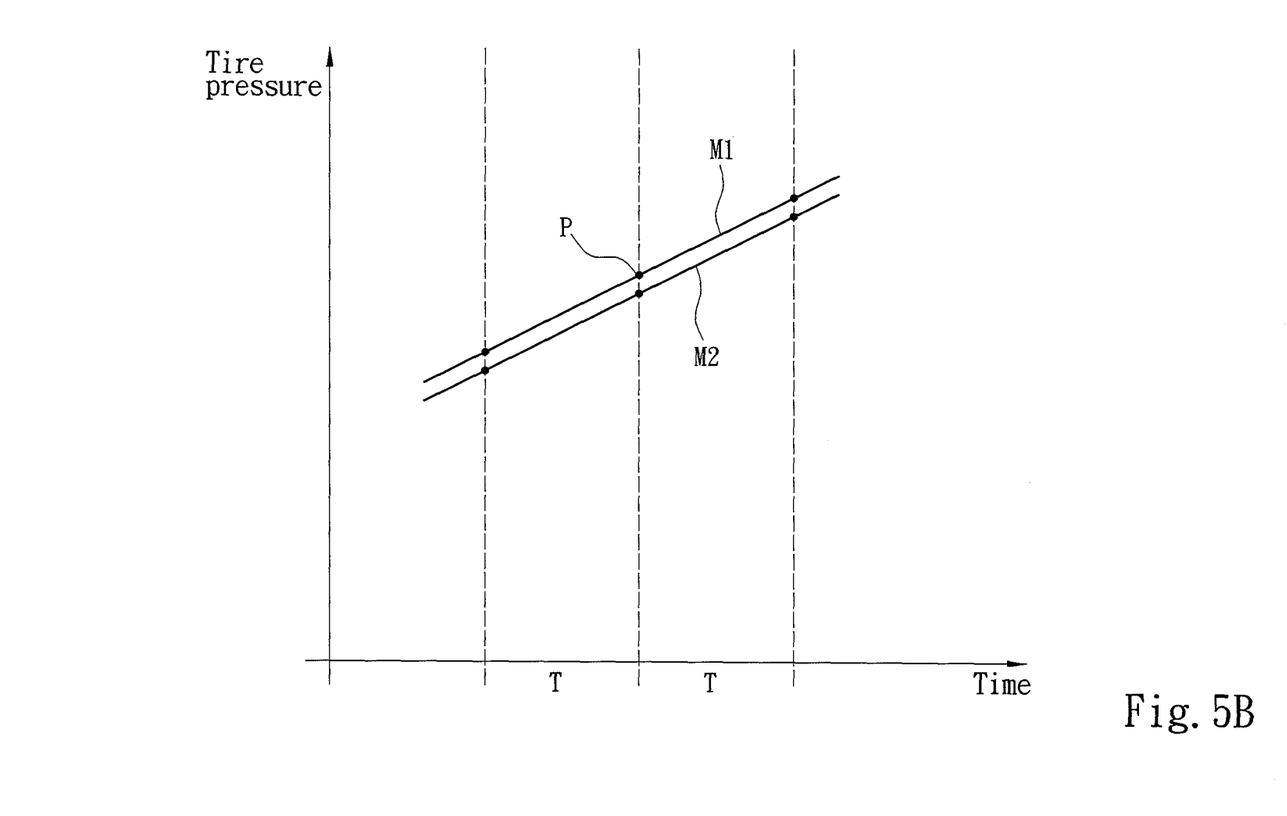
FIG. 5B is a schematic view of an embodiment of the invention showing tire pressures on a non-inclined vehicle.

Please also referring to FIGS. 5A and 5B, in one embodiment the step S2 further includes a sub-step S21 of activating judgment of vehicle abnormal loading: compare the gradient data M1 with a gradient abnormal datum R1; if the gradient data M1 has a value greater than or equal to the gradient abnormal datum R1, enter step S3; if the gradient data M1 has a value smaller than the gradient abnormal datum R1, redo execution of step S2. More specifically, during implementation if the loading of the vehicle 1 increases steadily, the gradient data M1 of each tire 11 generated after detection also increases steadily. In the event that loading of the vehicle 1 increases abruptly, the gradient data M1 of the tire 11 generated via detection also has drastic change greater than or equal to the gradient abnormal datum R1, then the invention can initially judge that the vehicle has possibility of experiencing abnormal loading, enter step S3.

Figure 5C:
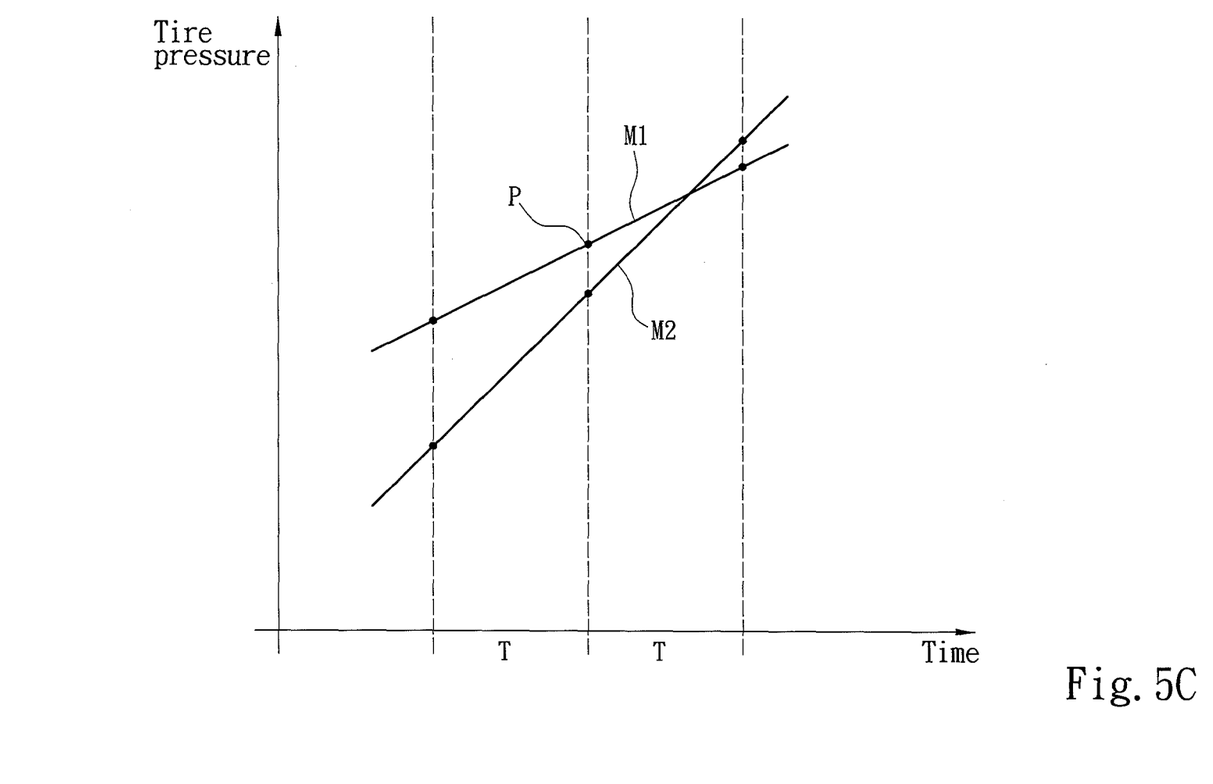
FIG. 5C is a schematic view of an embodiment of the invention showing tire pressures on an inclined vehicle.

Moreover, also referring to FIG. 5C, in another embodiment the step S2 can further include a sub-step S22 of judging vehicle inclination: get the gradient data M1 of one tire 11 and another gradient data M2 of another tire 13, and compare the gradient data M1 and M2 of these two tires 11 and 13; if the gradient data M1 and M2 are same, judge the vehicle being normal; if the gradient data M1 and M2 are different, judge the vehicle being inclined. More specifically, in the event that the vehicle 1 suddenly has the loading increased at one side, the tire 13 at the corresponding side withstands a greater loading pressure than the other tire 11, hence the interior pressure of the tire 13 increases notably, and the gradient data M2 also is greater than the other gradient data M1 calculated for the other tire 11 to make the two gradient data M1 and M2 different, thereby the vehicle 1 can be deemed in an inclined condition.

Figure 4:
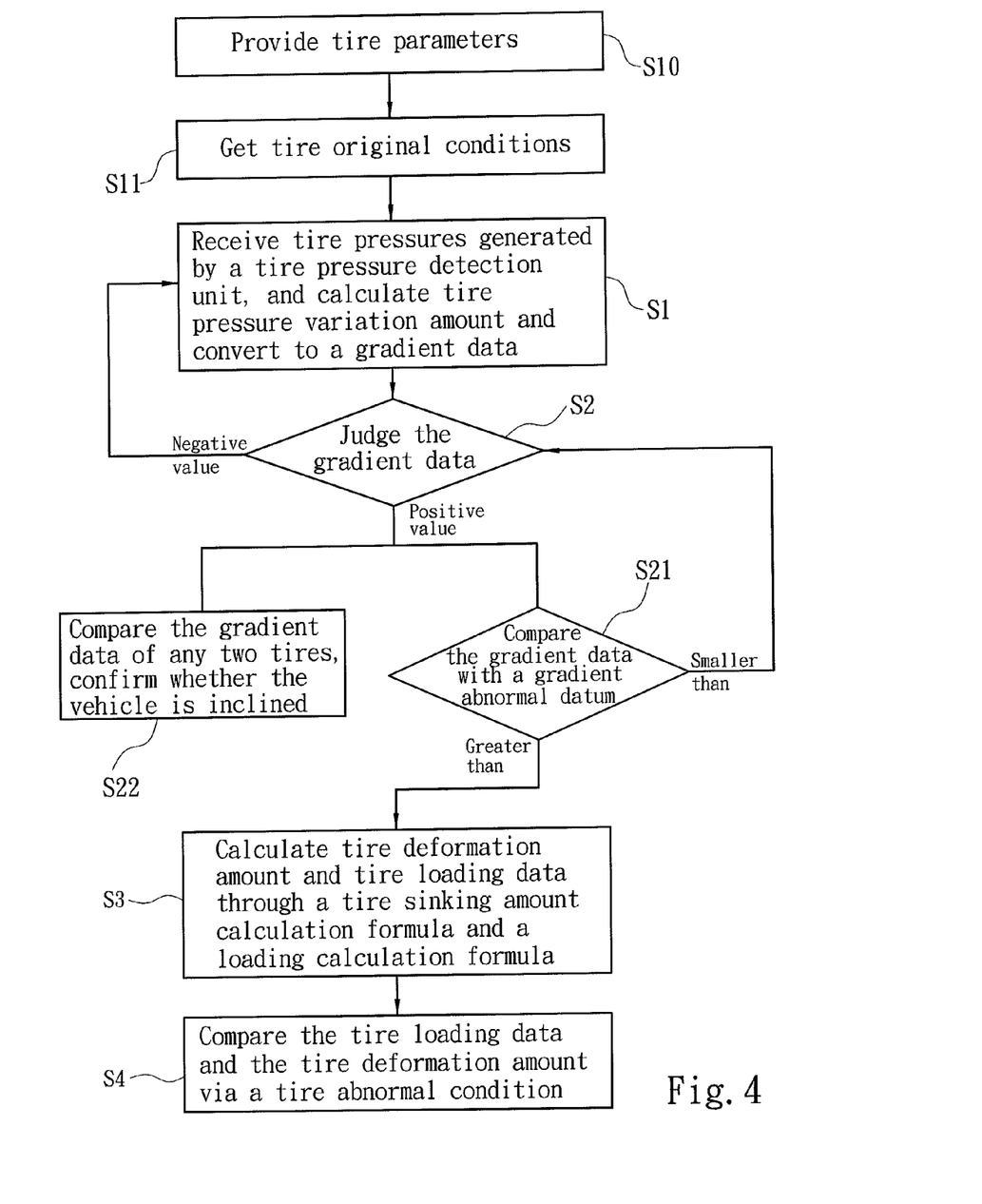
FIG. 4 is a process flowchart of another embodiment of the invention.

Also referring to FIG. 4, in yet another embodiment the step S1 can be preceded by a sub-step S11 of getting an original condition of the tire before execution: Keep the vehicle 1 at a without loading condition, get a tire original volume $V_0$ without loading through a tire volume calculation formula. The sub-step in this embodiment mainly is used on a replaced new tire 11 of the vehicle 1, and redo measurement of the tire interior volume after the tire 11 has been inflated and in a no loading condition to facilitate judgment of the invention later one to match more specific implementation conditions.

The tire volume calculation formula is as follow:

$$V_0 = \pi R^2 b$$

where R is the tire radius, b is the cross section width of the tire, and is $V_0$ is an original volume of the tire without loading.

In short, there are numerous types of tires on the market at present, in order to make more precise measurement, in one embodiment of the invention, the step S1 can be preceded by a sub-step S10 of providing tire parameters before execution.

As a conclusion, the method for judging abnormal loading of vehicles provided by the invention includes: first, receive a plurality of tire pressures generated by a tire pressure detection unit at a plurality of inspection time periods, and calculate variation amount of the tire pressures and convert to a gradient data; next, judge whether the gradient data is positive in value, if yes, calculate the tire pressure obtained at the last time via a tire sinking amount calculation formula and the tire parameter to get a tire deformation amount, and calculate the tire pressure obtained at the last time via a loading calculation formula and the tire parameter to get a tire loading data; then compare the tire loading data and the tire deformation amount via a tire abnormal condition; if the tire loading data and the tire deformation amount coincide with the tire abnormal condition, judge the vehicle in abnormal loading. Thus it can resolve the problem of the conventional judgment method of not taking into account of actual tire conditions that is prone to cause erroneous judgment.

What is claimed is:

1. A method for judging abnormal loading of vehicles adopted for use on a vehicle which includes a plurality of tires each including at least one tire parameter to represent tire characteristics and being equipped with a tire pressure detection unit which detects interior status of the tire in regular conditions and outputs a tire pressure after elapse of an inspection time period, the method comprising the steps of:

step 1: receiving tire pressures generated by the tire pressure detection unit at a plurality of inspection time periods and calculating variation amount of the tire pressure within each inspection time period and converting to a gradient data;

step 2: judging whether the gradient data is positive in value; entering the next step if positive; renewing execution of step 1 if negative;

step 3: calculating the tire pressure obtained at the last time and the tire parameter through a tire sinking amount calculation formula to get a tire deformation amount, and calculating the tire pressure obtained at the last time and the tire parameter via a loading calculation formula to get a tire loading data; and step 4: comparing the tire loading data and the tire deformation amount via a tire abnormal condition, and judging the vehicle in abnormal loading when the comparing outcome coincides with the tire abnormal condition.

2. The method of claim 1, wherein the tire sinking amount calculation formula is:

$$P = \frac{P_0 V_0}{V_0 - \left[\frac{2\sin^{-1}\left(\frac{\sqrt{2Rf - f^2}}{R}\right)\pi R^2}{360} - \frac{(2\sqrt{2Rf - f^2})(R - f)}{2}\right]b}$$

where R, $V_0$, $P_0$ and b are respectively the tire parameters, R is a tire radius, $V_0$ is an original volume of a tire without loading, $P_0$ is an original tire pressure without loading, b is a cross section width of the tire, and f is a deformation amount of the tire.

3. The method of claim 2, wherein the loading calculation formula is:

$$W = 2Pb\sqrt{2Rf - f^2}$$

where P, b and R are the tire parameters, P is the tire pressure, b is the cross section width of the tire, R is the tire radius, f is the deformation amount of the tire, and W is loading data of the tire.

4. The method of claim 1, wherein the tire abnormal condition is a tire sinking critical value for comparing with the tire deformation amount and a tire loading critical value for comparing with the tire loading data.

5. The method of claim 1, wherein the step 2 further includes a sub-step of activating judgment of vehicle abnormal loading: comparing the gradient data with a gradient abnormal datum; entering step 3 when the gradient data has a value greater than or equal to the gradient abnormal datum; renewing execution of step 1 when the gradient data has a value smaller than the gradient abnormal datum.

6. The method of claim 1, wherein the step 2 further includes another sub-step of judging vehicle inclination: getting the gradient data of one tire and another gradient data of another tire, and comparing the gradient data of these two tires; judging the vehicle being normal when the gradient data are same; judging the vehicle being inclined when the gradient data are different.

7. The method of claim 1, wherein the step 1 is preceded by a sub-step of getting an original condition of the tire before execution: keeping the vehicle in a without loading condition, and getting a tire original volume without loading of each tire through a tire volume calculation formula.

8. The method of claim 7, wherein the tire volume calculation formula is:

$$V_0 = \pi R^2 b$$

where R is a tire radius, b is a cross section width of the tire, and $V_0$ is an original volume of the tire without loading.

9. The method of claim 1, wherein the step 1 is preceded by another sub-step of providing the tire parameter before execution.

\* \* \* \* \*